UNITED STATES PATENT OFFICE.

ELMER A. SPERRY, OF CLEVELAND, OHIO, ASSIGNOR TO NATIONAL BATTERY COMPANY, OF CLEVELAND, OHIO, AND JERSEY CITY, NEW JERSEY, A CORPORATION OF NEW JERSEY.

STORAGE BATTERY.

SPECIFICATION forming part of Letters Patent No. 723,328, dated March 24, 1903.

Application filed August 12, 1901. Serial No. 71,711. (Specimens.)

*To all whom it may concern:*

Be it known that I, ELMER A. SPERRY, a citizen of the United States, residing at Cleveland, in the county of Cuyahoga and State of Ohio, have invented certain new and useful Improvements in Storage Batteries, of which the following is a specification.

This invention relates particularly to the active material of storage-battery elements. The base or chief constituent of such active material, such as pulverized lead, (including lead oxid,) is not of such a physical character as to form of itself a strongly-cohesive mass, such as is desirable in order that the active material may be retained in place upon the grids and resist the disintegrating influence of the electrolyte or of the jarring and shocks to which in some uses storage batteries are subjected. Heretofore various substances have been mixed with the active material to form a sufficiently-cohesive mass; but the use of such substances has involved other difficulties or objections, such as special treatment to which the elements must be subjected or interference with the desired action of the electrolyte upon the active material.

It is the object of this invention to provide a substance which may be added to the active material without interfering in any appreciable degree with the action of the electrolyte thereon, while the combination shall be self-setting and strongly cohesive. To this end an alkali-metal salt, preferably chemically-pure ammonium sulfate, is employed, to which is added a catalytic agent, preferably a small quantity of alizarin—say about eight one-hundredths of one per cent. This composition being a dry powder, as well as the active material, the two are thoroughly mixed together by any suitable means, as in a tumbling-barrel, and after being thoroughly mixed are moistened with a suitable menstruum, the alizarin apparently promoting as a catalytic agent the rapidity of the combination of the ammonium sulfate with the lead in the moistened mixture. The final combination thus produced is applied to the grid in the usual manner and is subjected to high pressure. When the element thus formed has been properly dried out, it will be found that the mass applied to the grid has set into a strongly-coherent dense mass, which will not disintegrate readily under the action of the electrolyte or the effect of jarring and shocks, while the action of the electrolyte on the active material is not interfered with to any appreciable extent, the mass apparently possessing such chemical or molecular porosity as facilitates the penetration and action of the electrolyte.

I claim as my invention—

1. A composition for storage-battery elements consisting of active material, ammonium sulfate, and a catalytic agent.

2. A composition for storage-battery elements consisting of active material, ammonium sulfate and alizarin.

3. A composition for storage-battery elements consisting of finely-divided lead, ammonium sulfate, and a catalytic agent.

4. A composition for storage-battery elements consisting of finely-divided lead, ammonium sulfate and alizarin.

5. The process of making storage-battery elements which consists in mixing finely-divided lead, ammonium sulfate, and a catalytic agent with a menstruum and drying out the mass.

6. The process of making storage-battery elements which consists in mixing finely-divided lead, ammonium sulfate and alizarin with a menstruum and drying out the mass.

7. A composition for storage-battery elements consisting of active material, an alkali-metal salt, and a catalytic agent.

8. A composition for storage-battery elements consisting of a metallic base, ammonium sulfate, and a catalytic agent.

9. A composition for storage-battery elements consisting of a metallic base, an alkali-metal salt, and a catalytic agent.

This specification signed and witnessed this 9th day of August, A. D. 1901.

ELMER A. SPERRY.

In presence of—
ROSWELL S. NICHOLS,
LUCIUS E. VARNEY.